United States Patent
Jamadagni et al.

(10) Patent No.: US 10,075,912 B2
(45) Date of Patent: Sep. 11, 2018

(54) METHOD AND APPARATUS FOR DYNAMICALLY ADJUSTING DRX SETTINGS OF USER EQUIPMENT

(71) Applicant: Samsung Electronics Co., Ltd., Gyeonggi-do (KR)

(72) Inventors: Satish Nanjunda Swamy Jamadagni, Bangalore (IN); Pradeep Krishnamurthy Hirisave, Bangalore (IN); Sarvesha Anegundi Ganapathi, Bangalore (IN)

( * ) Notice: Subject to any disclaimer, the term of this patent is extended or adjusted under 35 U.S.C. 154(b) by 72 days.

(21) Appl. No.: 14/401,810

(22) PCT Filed: May 16, 2013

(86) PCT No.: PCT/KR2013/004357
§ 371 (c)(1),
(2) Date: Nov. 17, 2014

(87) PCT Pub. No.: WO2013/172672
PCT Pub. Date: Nov. 21, 2013

(65) Prior Publication Data
US 2015/0124674 A1    May 7, 2015

(30) Foreign Application Priority Data

May 17, 2012  (IN) ........................... 1973/CHE/2012

(51) Int. Cl.
*H04W 76/28*    (2018.01)
*H04W 52/02*    (2009.01)
*H04W 8/20*    (2009.01)

(52) U.S. Cl.
CPC ......... *H04W 52/0209* (2013.01); *H04W 8/20* (2013.01); *H04W 52/0216* (2013.01);
(Continued)

(58) Field of Classification Search
CPC ... H04W 52/02; H04W 8/20; H04W 52/0216; H04W 52/0209; H04W 76/048;
(Continued)

(56) References Cited

U.S. PATENT DOCUMENTS

| 7,020,477 B2 | 3/2006 | Cramby et al. |
| 2005/0032555 A1 | 2/2005 | Jami et al. |

(Continued)

FOREIGN PATENT DOCUMENTS

| EP | 2157830 A1 | 2/2010 |
| EP | 2360974 | 8/2011 |

(Continued)

OTHER PUBLICATIONS

European Search Report issued for EP 13790181.5 dated Nov. 11, 2015, 9 pages.
(Continued)

*Primary Examiner* — Jae Y Lee
*Assistant Examiner* — Aixa Guadalupe-Cruz

(57) ABSTRACT

A method and system for dynamically adjusting Discontinuous Reception (DRX) settings of user equipment (UE) is disclosed. The method dynamically adjusts DRX settings based on network operator provided service or location of the UE and converged services supported by the network and so on. The UE indicates the network for adjusting DRX settings when DRX settings needs to be changed based on above parameters. Further, the wireless network provides the DRX settings to UE based on parameters. The method provides subscription information of the UE to access network. The method dynamically adjusts the DRX settings when the UE is in a Femtocell area or the UE associated with features like One Number. The UE can initiate a inter UE session transfer to the other UEs. The UE indicates the network that the sessions have been transferred. The network applies possible signaling optimizations to the UE.

37 Claims, 7 Drawing Sheets

(52) U.S. Cl.
CPC ............. *H04W 76/28* (2018.02); *Y02D 70/00* (2018.01); *Y02D 70/1244* (2018.01); *Y02D 70/1246* (2018.01); *Y02D 70/24* (2018.01); *Y02D 70/25* (2018.01)

(58) Field of Classification Search
CPC ..... H04W 8/02; H04W 52/244; H04W 24/00; H04W 72/042; H04W 4/005; H04W 52/0251; H04W 72/02; H04W 76/028; H04W 52/0212; H04W 52/0258; H04W 52/143; H04W 72/1215; H04W 24/08; H04W 52/242; H04B 15/00; H04B 7/0697; H04L 1/0041; H04L 1/0045; H04L 1/06; H04L 27/34; H04L 5/14; H04L 5/0037; H04L 1/0038
See application file for complete search history.

(56) References Cited

U.S. PATENT DOCUMENTS

| | | |
|---|---|---|
| 2007/0291673 A1 | 12/2007 | Demirhan et al. |
| 2009/0238098 A1 | 9/2009 | Cai et al. |
| 2010/0130237 A1 | 5/2010 | Kitazoe et al. |
| 2011/0194505 A1* | 8/2011 | Faccin ................. H04W 48/18 370/329 |
| 2011/0292854 A1 | 12/2011 | Terry et al. |
| 2012/0263145 A1* | 10/2012 | Marinier ............... H04W 36/22 370/331 |
| 2014/0022974 A1* | 1/2014 | Eriksson ........... H04W 56/0005 370/311 |
| 2014/0119255 A1* | 5/2014 | Vannithamby ......... H04B 15/00 370/311 |
| 2015/0215830 A1* | 7/2015 | Dalsgaard ......... H04W 36/0094 455/444 |

FOREIGN PATENT DOCUMENTS

| | | | |
|---|---|---|---|
| WO | WO 2012/052598 | 4/2012 | |
| WO | WO 2012141630 A1 * | 10/2012 | ........ H04W 56/0005 |

OTHER PUBLICATIONS

International Search Report dated Sep. 6, 2013 in connection with International Patent Application No. PCT/KR2013/004357, 3 pages.
Written Opinion of the International Searching Authority dated Sep. 6, 2013 in connection with International Patent Application No. PCT/KR2013/004357, 6 pages.

* cited by examiner

[Fig. 1]
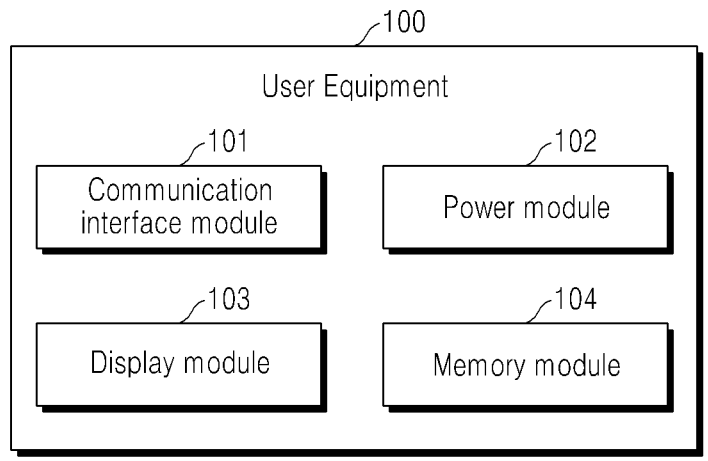
[Fig. 2]
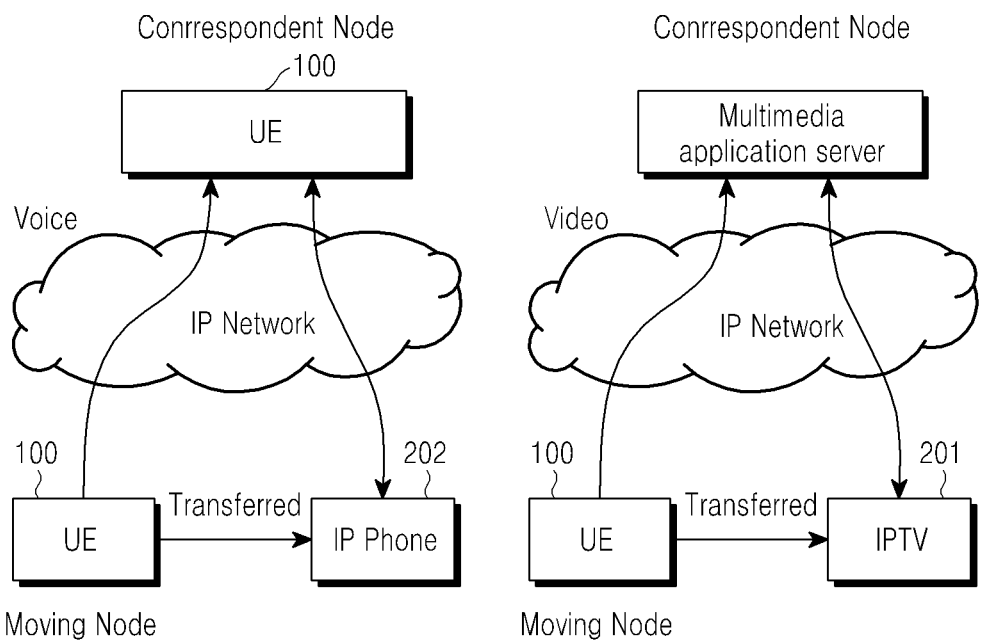

[Fig. 3]
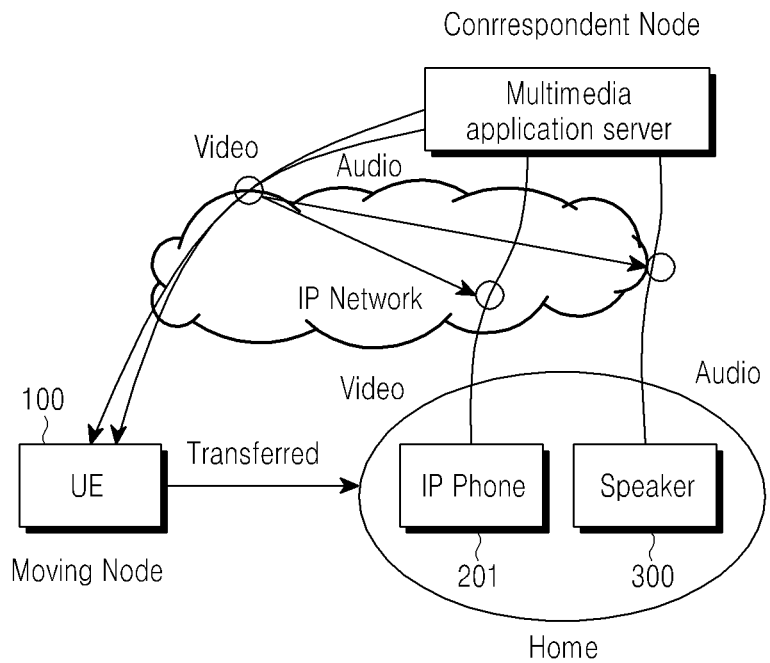
[Fig. 4]
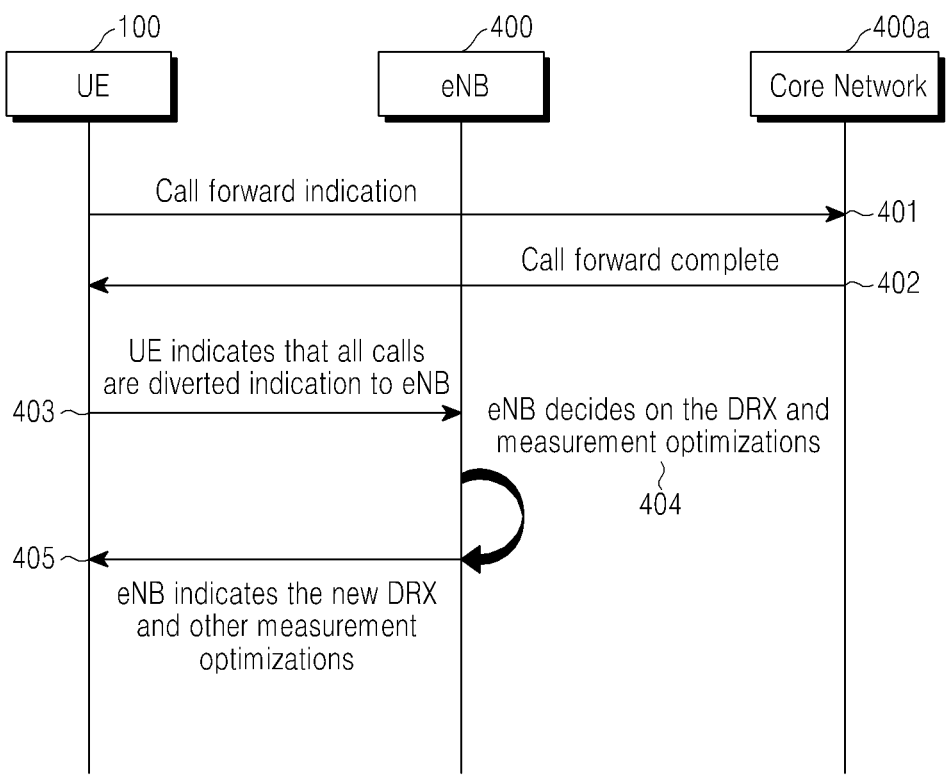

[Fig. 5]
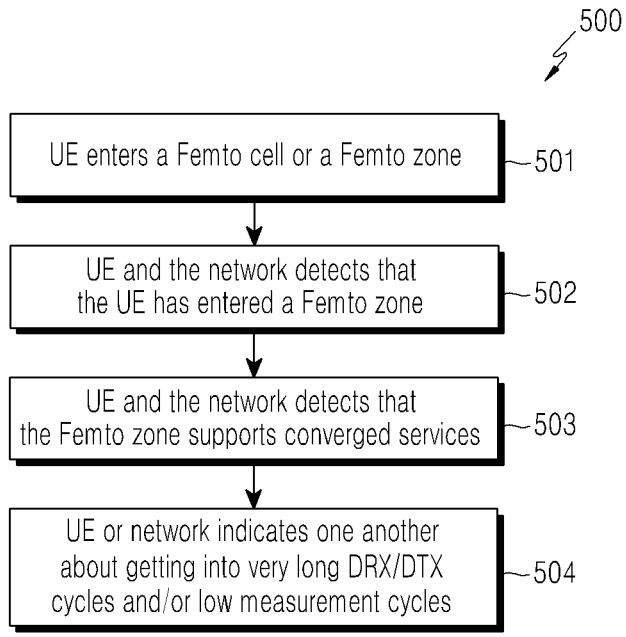
[Fig. 6]
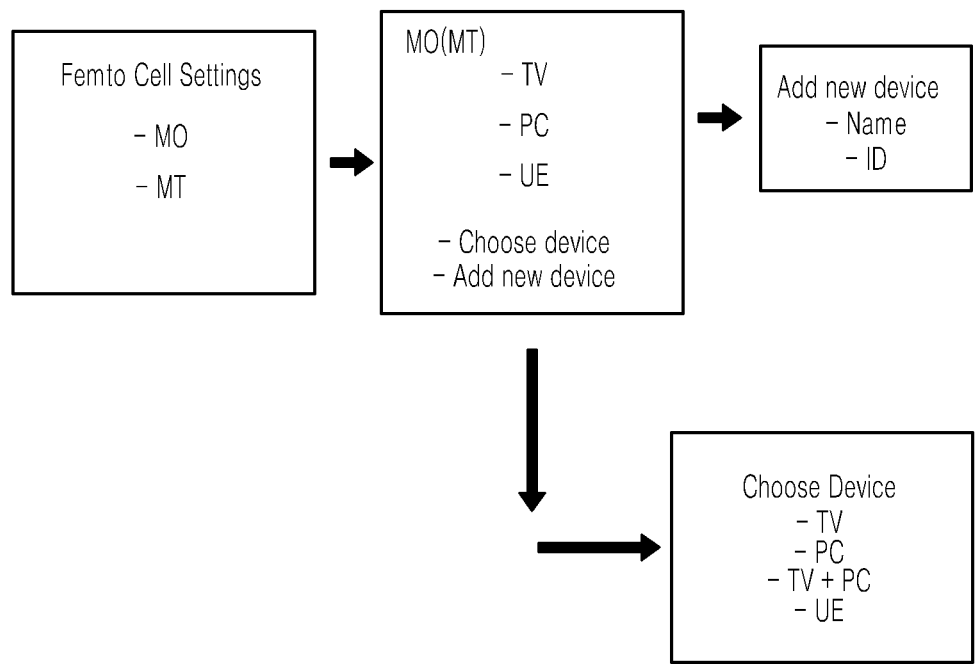

[Fig. 7]
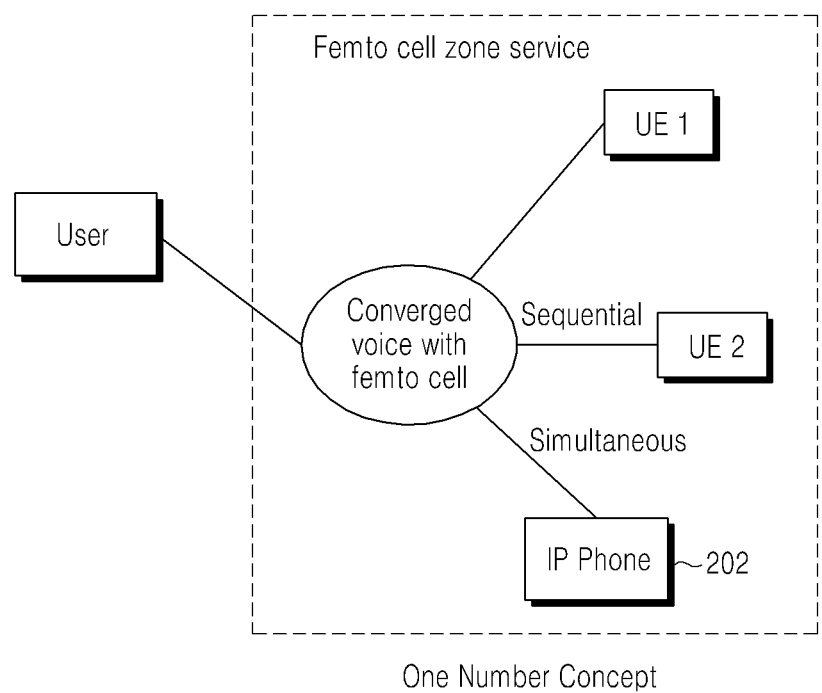
One Number Concept

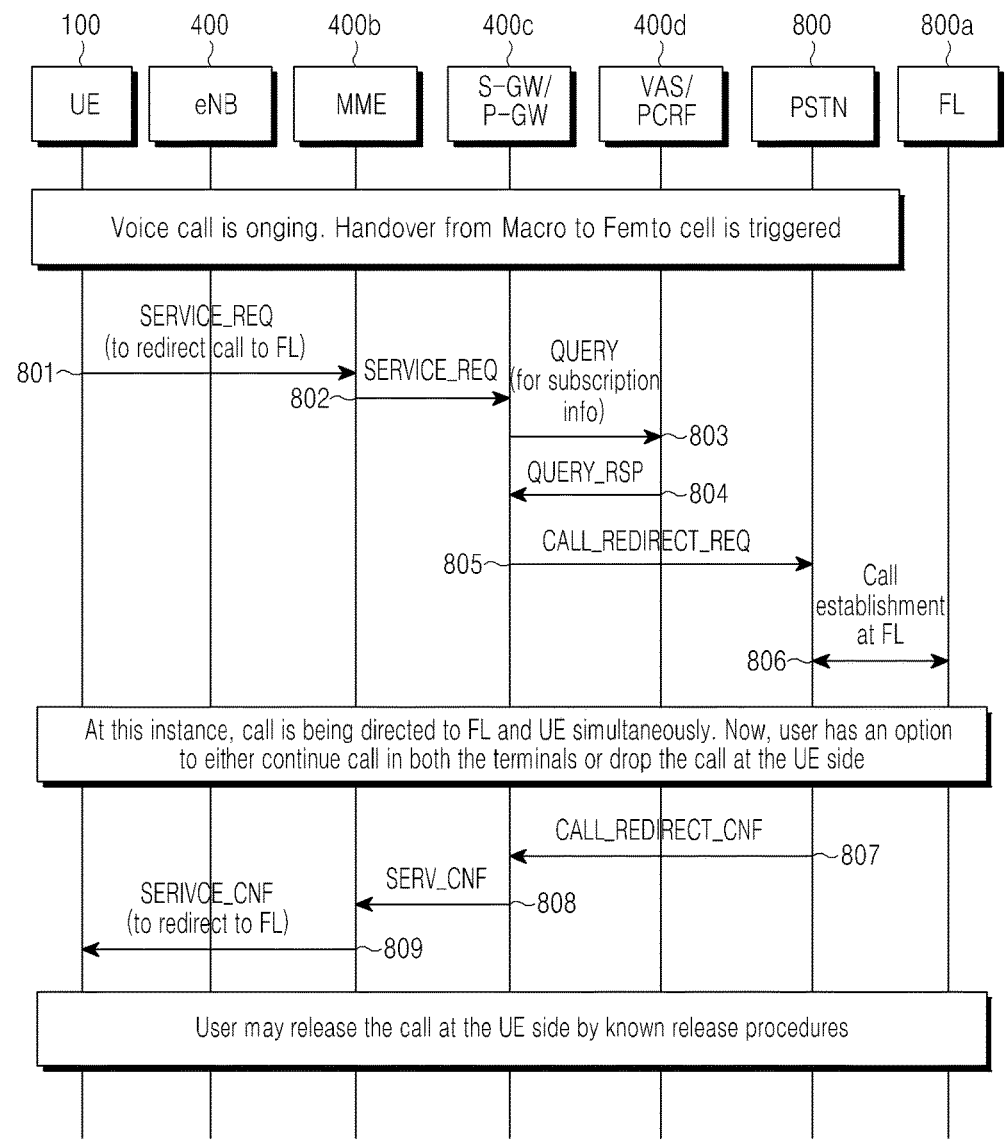

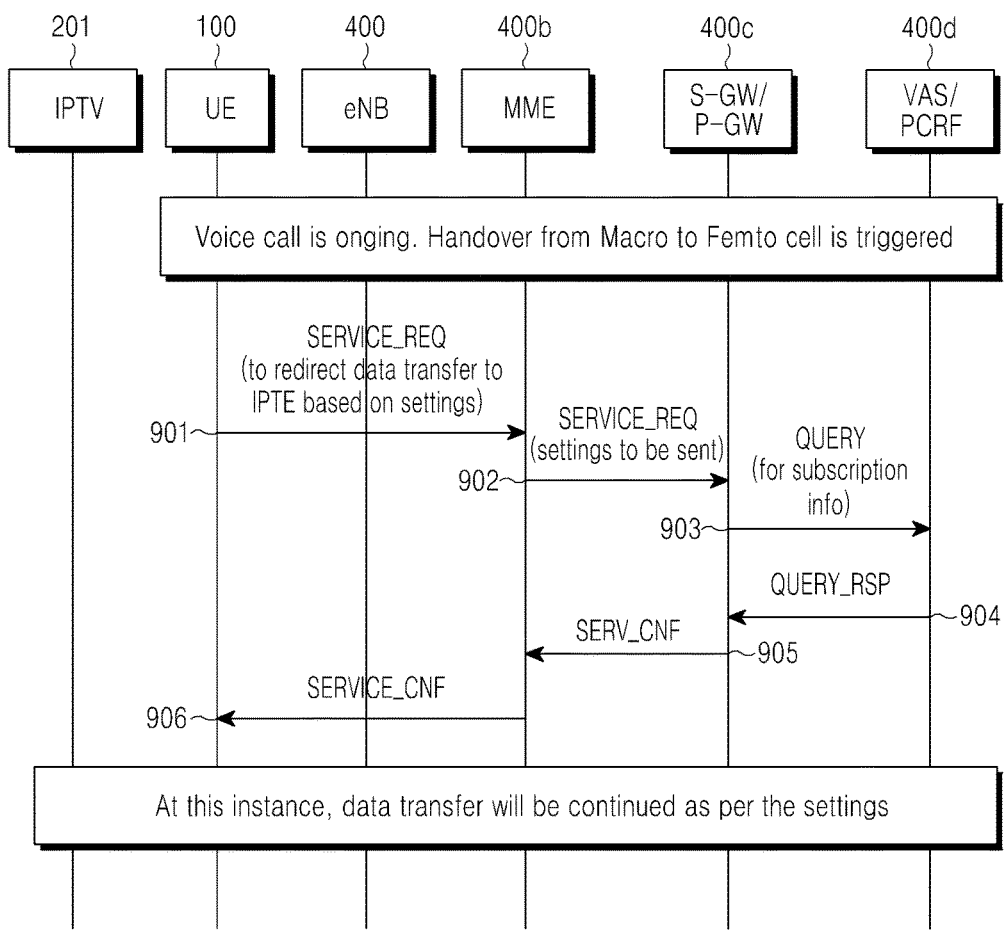

[Fig. 10]
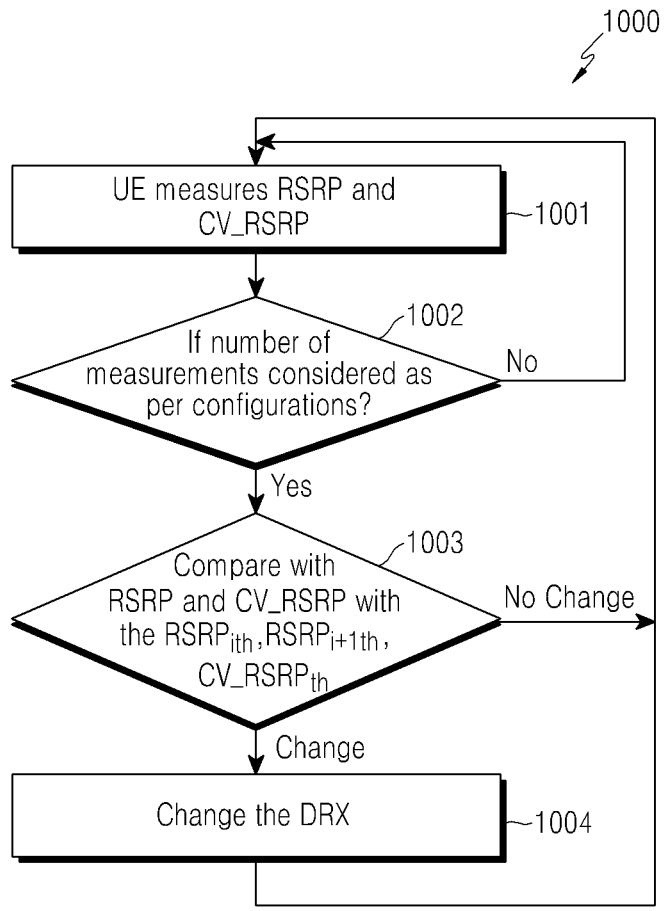
[Fig. 11]
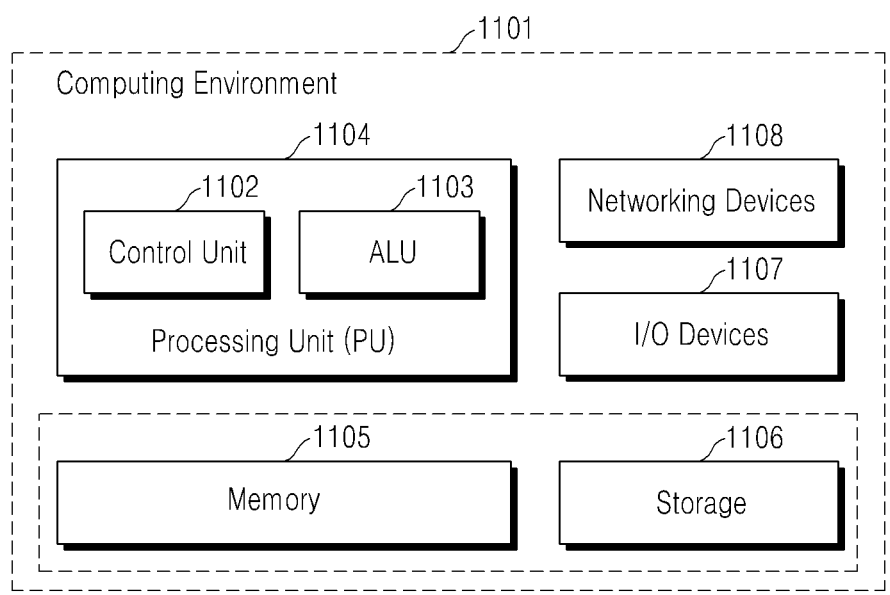

METHOD AND APPARATUS FOR DYNAMICALLY ADJUSTING DRX SETTINGS OF USER EQUIPMENT

CROSS-REFERENCE TO RELATED APPLICATION(S)

The present application claims priority under 35 U.S.C. § 365 to International Patent Application No. PCT/KR2013/004357 filed May 16, 2013, entitled "METHOD AND APPARATUS FOR DYNAMICALLY ADJUSTING DRX SETTINGS OF USER EQUIPMENT". International Patent Application No. PCT/KR2013/004357 claims priority under 35 U.S.C. § 365 and/or 35 U.S.C. § 119(a) to Indian Patent Application No. 1973/CHE/2012 filed May 17, 2012 and which are incorporated herein by reference into the present disclosure as if fully set forth herein.

TECHNICAL FIELD

The present invention relates to the field of wireless communication networks and more particularly relates to method and apparatus for adjusting DRX settings dynamically to user equipment (UE) in a wireless network.

BACKGROUND ART

The 3rd Generation Partnership Project (3GPP), acting as an important organization in mobile communication field, greatly pushes the standardization of Third Generation (3G) techniques and has proposed a series of standards including Wide Code Division Multiple Access (WCDMA), High Speed Downlink Packet Access (HSDPA), High Speed Uplink Packet Access (HSUPA) and so on.

Along with the development of communication techniques towards mobility and broadband, power saving problem of user equipment (UE) has attracted widespread attention. Many communication standard organizations have considered the power saving problem, when making relevant standards. In particular, access networks of future mobile communication systems will be based on Internet Protocol (IP) technique for data transmission. The burst of IP packets and the share of transmission channels among users make the data arrived at the UE in a discontinuous manner. Therefore, it becomes more important to save battery power of the UE.

In the mobile communication system, information exchange between the UE and an access network relies on power supply of both sides. The UE can be a cell phone, laptop and Personal Digital Assistant (PDA) which runs on battery power. Therefore, to lower power consumption and prolong standby and service time of the UE become a key problem for designing the mobile communication system. In order to lower the power consumption of the UE, Discontinuous Reception (DRX) mode is employed in 3GPP standard. In particular, in the DRX mode, the UE monitors a channel and receives downlink services in a pre-defined time interval negotiated with the access network, thereby reducing unnecessary time for monitoring the channel and reducing power consumption of the UE.

In operation, when the UE is connected to a network, the UE and the network negotiate the connection details. In some systems, the UE will enter a "sleep" state and wake periodically to "listen" for paging messages, or be in an active state when a paging message can be received. When sleep states are used, part of the negotiation of the UE with the network may be to determine and set a sleep period, or a period of inactivity. Thus, the network knows when the UE will be expecting paging signals, and can transmit paging signals during a period of time when the UE will be listening for such paging signals.

DISCLOSURE OF INVENTION

Technical Problem

In current systems, the sleep period negotiated between the UE and the wireless network is fixed. The sleep period may be set according to a profile set up on the UE, and may be different for different types of UE and so on. However, generally, once the sleep period is set by the network, the period is fixed. Also, a sleep period that is too long may result in unnecessary or even unacceptable levels of delay in receiving a paging signal. On the other hand, a sleep period that is too short may significantly reduce the operating life of the battery in the UE (i.e., by depleting battery power by waking up too frequently).

Typically, the DRX value settings are handled by the network operators based on some statistical data available at the wireless network, but there are some instances where the DRX settings of the UE can be adjusted dynamically.

Due to above mentioned reasons; it is evident that the existing system does not provide adjustable DRX settings based on location of the UE, converged services subscribed by the UE.

Solution to Problem

The principal object of the embodiments herein is to provide a method and system for dynamically adjusting the DRX settings of user equipment (UE) based on parameters.

Another object of the invention is to provide a method and system for providing subscription information of the UE to an access network for optimizing the DRX settings of the UE.

Another object of the invention is to provide a method for adjusting the DRX settings of the UE based on the converged services supported by the UE and a wireless network.

Accordingly the invention provides a method for dynamically adjusting discontinuous reception (DRX) settings of a user equipment (UE) connected to a wireless network, wherein the method comprises indicating to the wireless network by the UE for adjusting the DRX settings, when the DRX settings needs to be changed based on at least one parameter. Further the method comprises providing at least one DRX setting to the UE by the wireless network based on the at least one parameter.

Accordingly the invention provides a wireless network for dynamically adjusting discontinuous reception (DRX) settings of a user equipment (UE), wherein the wireless network is configured to receive an indication from the UE for adjusting the DRX settings, when the DRX settings of the UE needs to be changed based on the at least one parameter. Further the network is configured to provide at least one DRX setting to the UE based on the at least one parameter.

Accordingly the invention provides a User Equipment (UE) for dynamically adjusting discontinuous reception (DRX) settings, connected to a wireless network, wherein the UE comprises an integrated circuit. Further the integrated circuit comprises at least one processor and at least one memory. The memory comprises a computer program code within the circuit. At least one memory and the computer program code with the at least one processor cause the UE to provide an indication to the wireless network for adjusting the DRX settings, when the DRX settings needs to be changed based on the at least one parameter. Further the UE is configured to receive at least one DRX setting from the wireless network based on the at least one parameter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates the block diagram of a user equipment with various modules, according to embodiments as disclosed herein;

FIG. 2 illustrates an exemplary network that supports converged services, according to the embodiments disclosed herein;

FIG. 3 illustrates the method of splitting the voice and video to two devices which are connected in an IP network, according to the embodiments as disclosed herein;

FIG. 4 illustrates a sequence diagram in which the UE enables the call forwarding mechanism for possible DRX optimizations, according to embodiments as disclosed herein;

FIG. 5 illustrates a flow diagram explaining the process of obtaining DRX optimization settings by the UE, according to the embodiments as disclosed herein;

FIG. 6 illustrates the settings provided to the UE for redirecting the calls or for data transfer to other UEs to obtain the DRX optimization settings, according to the embodiments as disclosed herein;

FIG. 7 illustrates one number concept for dynamically adjusting the DRX optimization settings of the user equipment, according to the embodiments as disclosed herein;

FIG. 8 illustrates the sequence diagram in which subscription information is retrieved for redirecting the voice call to a fixed line (FL), according to the embodiments as disclosed herein;

FIG. 9 illustrates the sequence diagram in which a data transfer session is redirected to IPTV for obtaining DRX optimization settings, according to the embodiments as disclosed herein;

FIG. 10 illustrates the flow diagram explaining the process of adjusting the DRX settings of the user equipment based on the measurement reports, according to the embodiments disclosed herein; and FIG. 11 illustrates a computing environment implementing the method and system for dynamically adjusting the DRX settings of the user equipment based on the parameters, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for dynamically adjusting the DRX settings of user equipment (UE) based on the parameters including but not limited to a network operator provided service or the location of the UE or converged services supported by the network and the UE, application running on the UE, measurement report sent by the UE and service type of an ongoing service in the UE.

The UE indicates to the wireless network for adjusting the DRX settings, when the DRX settings needs to be changed based on above parameters. Further, the wireless network provides a DRX setting to the UE based on the parameters described above.

In an embodiment, the UE can be a mobile phone, a smart phone, Personal Digital Assistant (PDA), IPTV, Personal Computer (PC) or the like.

In an embodiment, the method dynamically adjusts the DRX settings when the UE is in a Femtocell (for example Home cell) or in a Femto Zone area and specifically, when the UE is also associated with features like "One Number", where an incoming call can be received on a fixed line (no concern for missed pages for the UE) the DRX settings can be extra long.

In an embodiment, when the UE invokes a call forward service, all calls will be received on the forwarded device (new UE), this call forward information is then notified to a eNB (Radio Access Network) for enabling possible DRX setting and other signaling optimizations.

In an embodiment, the call forward service or location specific service assistance information is sent to the eNB by the UE in a Radio Resource Control (RRC) or a Non-access Stratum (NAS) message.

For example, the RRC message is the RRC Connection Release message. In an embodiment the service assistance information can be sent in a new RRC message.

In an embodiment, the UE initiates a inter UE session transfer using the IP multimedia system (IMS). During the session transfer, the UE indicates the eNB that the sessions have been transferred and the current device (UE) might not receive sessions for quite some time. Then the eNB applies possible signaling optimizations to the UE.

In an embodiment, the UE indicates a time period for which the UE will not receive the sessions from the eNB.

Further, the method disclosed herein provides the subscription information of the UE from a core network (CN) to the eNB. In an embodiment, the UE may also indicate that the UE would prefer to get into extra long DRX/DTX (Discontinuous Transmission) mode once it enters certain zones and get into extra long DRX modes. Such zones also make it possible for the UE to have "UE specific IDLE mode DRX" or zone specific DRX.

In an embodiment, the UE can request for specific DRX cycles or the network with such awareness can indicate specific DRX (during IDLE or CONNECTED mode).

Throughout the description the terms wireless network and network are used interchangeably.

Referring now to the drawings and more particularly to FIGS. 1 through 11 where similar reference characters denote corresponding features consistently throughout the figures, there are shown preferred embodiments.

FIG. 1 illustrates the block diagram of user equipment with various modules, according to embodiments as disclosed herein. As depicted in the figure, the user equipment (UE) 100 comprises a communication interface module 101, a power module 102, a display module 103 and a memory module 104. The communication interface module 101 helps the UE to connect to the wireless network. The power module 102 holds the battery information and status of battery power in the user equipment 100. The battery information comprises the amount of charge that the device possesses and the time period for which the user equipment 100 will be in operation and so on. The display module 103 of the user equipment 100 comprises of a user interface which can be a virtual keypad or through any other means by which a user can input some data into the user equipment 100. The memory module 104 may include a random access memory (RAM) or another type of dynamic storage device that may store information and instructions, for example an application, for execution by processor, a read-only memory (ROM) device or another type of static storage device.

FIG. 2 illustrates an exemplary network that supports converged services, according to the embodiments disclosed herein. As depicted in the figure, plurality of networks supports converged services like IP Multimedia Subsystem (IMS). This enables the IMS user to transfer one or more media components of an ongoing multimedia session between different UEs. The different UEs shown in the figure may include but not limited to IPTV 201 and IP phone 202.

In the example shown in the figure, the user is having a multimedia session with his UE 100 with a voice and video components. Subsequently, the user transfers the voice component from UE 100 to the IP phone 201 and transfers the video component from UE 100 to the IPTV 202 through the IP network. When the session is transferred from the UE 100 to a plurality of devices in the IP network, then there is no need for the UE 100 to be in connected mode. Hence, the UE 100 can indicate the session transfer to the eNB for obtaining DRX optimization settings.

FIG. 3 illustrates the method of splitting the voice and video to two devices which are connected in an IP network, according to the embodiments as disclosed herein. The figure depicts the transfer of voice and video to a plurality of devices in the IP network. In an embodiment, when the UE 100 receives an IMS level terminal redirect command, the UE 100 can switch the media session to the other device (for example: IPTV 201 receives the video, whereas the speaker 300 receives the audio from the UE 100). Further, the UE 100 indicates the transfer of media session to the eNB for possible DRX optimization settings.

FIG. 4 illustrates a sequence diagram in which the UE enables the call forwarding mechanism for possible DRX optimizations, according to the embodiments as disclosed herein. As depicted in the sequence diagram, the UE 100 initially sends (401) the call forward indication to the core network 400a. In response to the call forward indication from the UE 100, the core network 400a sends (402) the call forward complete message to the UE 100.

Further, UE 100 sends (403) an indication to the eNB 400 stating that all calls are diverted. The eNB 400 further decides (404) on the possible DRX cycles and measurement optimizations to the UE 100. Finally, the eNB 400 indicates (405) the new DRX and other measurement optimizations to the UE 100.

FIG. 5 illustrates a flow diagram explaining the process of obtaining DRX optimization settings by the UE, according to the embodiments as disclosed herein. As depicted in the flow diagram 500, initially the UE 100 enters (501) a Femtocell or Femto zone, where the UE 100 is provided with a set of services as long as the UE 100 is in that Femto zone, the network and the UE detects (502) the zone as Femto zone.

Further, the network and UE 100 identifies (503) that the Femto zone supports converged services.

Typically, the Femtocell refers to a small cellular base station designed for use in residential or small business environments. It connects to the service provider's network through broadband (for example DSL or cable) and is designed to support a number of UEs operating in the environment.

Also, the Femtocell allows a user with an existing UE to access cellular voice and data services over Internet Protocol (IP). The Femtocells allow service providers to extend the reach of their services to users within a "home zone" while leveraging the user's broadband connection. This not only allows a service operator to address coverage holes, but it also gives the operator an opportunity to potentially shape enduser behavior, by encouraging the use of 3G data services in the home Femtocell, where such data services can be faster and cheaper.

For simple voice and data services, an end user gets the benefit of better coverage and faster access through the use of a Femtocell. Moreover, many vendors are developing technologies that allow service parity between a macro network and the Femtocell network. This includes voice, SMS, data, supplementary services, voicemail, and handoff. Further, new services can be made available, such as IPTV on the UE, remote access to home PC content, and soft phone based services.

For supporting converged services by the Femtocell, there exists a convergence server which is responsible for providing an all-IP approach to core network integration for Femtocells. Further, the convergence server integrates a Session Initialization Protocol (SIP)-based Femtocell access point into the UE's core network by delivering key capabilities of the service, which includes updating the user's location to be the Femtocell to enable voice services providing full messaging services such as SMS ensuring end-users have access to the same set of supplementary services (for example, call forwarding, call waiting, call hold, and the like) on the Femtocell network that they have on the macro cellular network and handoff between the Femtocell and macro cellular networks. In addition, the convergence server enables enhanced IP services through a Femtocell.

Once the UE 100 and network detects that the Femto zone supports the converged services, the UE 100 indicates the network that the UE 100 is accessing the services of the Femtocell and hence the UE 100 indicates (504) the network for possible DRX optimization settings.

In an embodiment the UE 100 obtains very long DRX cycles and/or measurement cycles, once it enters the Femto zone that supports converged services.

In an embodiment, an optimization procedure in non-DRX period comprises the reduced frequency of System Information Blocks (SIB) or paging readings.

In an embodiment, the UE 100 may not receive SIB and paging messages during every DRX cycle to save the battery power. The reception or reading frequency depends on the DRX cycle for optimizing the power saving against the information update (by reading SIBs).

In an embodiment, the DRX cycles comprises multiple paging cycles or SIB transmission frequency. Further, the Femtocell can initiate the extended DRX cycles for the UE 100, if a group of devices are selected for communication (which means the UE transfers all the voice and data transfers to group of devices when it is camping on the Femtocell).

In an embodiment, the UE 100 obtains the extra long DRX cycles from the Femtocell in a S1 message.

In an embodiment, the Femtocell can also vary the DRX cycles dynamically to the UE 100 based on the measurement reports sent by the UE.

Further, the Femtocell notifies the UE 100 over an associated channel (for example PDCCH).

In an embodiment, the UE 100 automatically enters into very long DRX cycles when the network (Femtocell) provides the long DRX cycles to the UE 100. Further, the UE 100 requests for the DRX period and ON-OFF time for the DRX cycles during the camping procedure (when UE is camping on the Femtocell).

In an embodiment, the UE 100 can dynamically change the DRX cycle and indicates the next wake up time to the network (Femtocell).

In an embodiment, for dynamic DRX adjustment to the UE 100, the network (Femtocell) informs the UE 100 about the controlling parameters for effectively changing the DRX cycle. The controlling parameters may include but not limited to $RSRP_{th}$, normal_means, $RSRP_{i,th}$, $CV\_RSRP_{max}$, DRX Cycles, Number of Measurements i (Mi), where i=1 . . . N with N=Number of steps in the Dynamic DRX.

In an embodiment, optimization of other periodic signaling procedures (NAS/RRC) as long as UE 100 is in Femtocell is performed using the existing NAS and RRC procedures. Further, the periodic Tracking Area (TA)/Routing Area (RA) updates are minimized when the UE 100 is in extended long DRX cycles indicating that UE 100 is in Femtocell and will not move out of Femto immediately. As such when UE 100 moves out of or into Femtocell, TA/cell update is mandatory based on the UE 100 in idle/connected mode. The various actions in flow diagram 500 may be performed in the order presented, in a different order or simultaneously. Further, in some embodiments, some actions listed in FIG. 5 may be omitted.

FIG. 6 illustrates the settings provided to the UE for redirecting the calls or for data transfer to other UEs to obtain the DRX optimization settings, according to the embodiments as disclosed herein. In an embodiment, when the UE 100 enters a subscribed zone where the calls can be redirected to fixed IP devices or fixed lines (FL).

For redirecting the calls or for data transfer, some settings are provided to the UE 100. These settings enable data transfer or call redirection to a group of IP devices or fixed lines in the Femto zone. As depicted in the figure, Femto zone settings are provided to the UE 100 in which the option for selecting Mobile Originated (MO) call and Mobile Terminated (MT) call to redirect to fixed IP devices. In an embodiment, these settings can be initiated from the UE 100 or can be updated through Operator and Maintenance (OAM) console.

When the UE 100 is in the Femto zone, and is in idle mode, the network can initiate a call by paging the UE 100 during the non-DRX period if the device chosen in the MT call setting is new UE. Else, the network pages the chosen device in the MT settings of the UE 100 for initiating the data transfer. Further, the settings provided to the UE 100 can be changed at any time and the changed settings in the UE 100 are indicated to the Femtocell or the core network 400*a*.

In an embodiment, multiple devices are selected in the UE 100 settings and the network either unicasts or multicasts the partial data to individual selected device.

In case of UE 100 initiated calls, the network will page the UE 100 during the non-DRX period if the device selected in the MO setting is new UE. Otherwise, the network pages the chosen device in the MO settings of the UE as a response to the Random Access Channel (RACH) from the UE 100 for initiating the data transfer.

In an embodiment, in connected mode, the data exchange between devices may be explicit, where the user may manually sync the UE 100 with the device to transfer the data or can be implicit where the UE 100 will sync with the selected device for the first time it camps on Femtocell and then will obtain the latest downloaded data periodically, it enters the non-DRX mode (with Low Power profile). The data transfer will be continuous (till entire session transfer is complete). If the measurement reports indicate that the UE 100 is moving away from Femtocell and if multiple devices are selected in the UE settings, then UE 100 can simultaneously receive data from multiple devices and thereby reducing the latency.

FIG. 7 illustrates one number concept for dynamically adjusting the DRX optimization settings of the user equipment, according to the embodiments as disclosed herein. The one number concept typically involves providing the service through the same telephone number and user always has access to the convenient functions on the telephone system. Further, the user can collect all messages through a single voice mailbox and conveniently retrieve them at the PC.

In one implementation, the one number concept is as described herein. In an example, when the user has a meeting or business dinner with an important partner. The user can reroute all calls to his/her assistant when the user do not want to be disturbed, letting him/her answer and process the important calls to the user. When the meeting is concluded the user can simply switch off the call forwarding option.

In another example, when the user is on his/her way to the office, the user may receive a long-anticipated call from a new client. If the user's mobile phone is integrated as a mobile extension of the company's telephone network, clients can reach the user even though they do not know the user's mobile phone number.

Using the one number concept that provides converged service to the user, the UE 100 can indicate the eNB 400 that UE 100 has been utilizing the converged services such as "one number" and also can request for possible DRX optimization settings from the network.

In an embodiment, the network (for example the RAN) can provide the UE 100 with a plurality of DRX optimization setting to the UE 100. The UE 100 receives the plurality of DRX optimization settings and selects one DRX setting and indicates the selected DRX setting to the network.

FIG. 8 illustrates the sequence diagram in which subscription information is retrieved for redirecting the voice call to a fixed line (FL), according to the embodiments as disclosed herein. As depicted in the sequence diagram, when the voice call is ongoing and a handover of UE 100 from Macro cell to Femtocell is triggered, the UE 100 redirects the voice call to a fixed landline (FL) 800*a*. Even though in this embodiment, the FL 800*a* is used as an example, the device can be any device which is chosen based on the settings provided to the UE (as described in FIG. 7).

In an embodiment, the handover takes place when UE 100 detects a Femtocell within a given area. Once the UE 100 detects the Femtocell, the UE 100 indicates the eNB 400 about the Femtocell in the given area and releases the RRC connection with the eNB 400 for accessing the converged services of the Femtocell.

In an embodiment, when the voice call is ongoing and the handover takes place from the macro cell to the FL 800a, then the redirection of voice call to the FL 800a by the UE is as described herein.

Initially, the UE 100 sends (801) a SERVICE REQUEST to the MME 400b of the UE 100 for redirecting the call to FL. The MME 400b, upon receiving the service request from the UE 100, redirects (802) the SERVICE REQUEST (SERVICE_REQ) to the S-GW or P-GW 400c.

The S-GW or P-GW 400c queries (803) the Value Added Services (VAS) or Policy Charging and Rules Function (PCRF) 400d, for obtaining the subscription information of the UE 100.

In an embodiment, the S-GW or P-GW 400c identifies whether the UE 100 has subscribed for the service (for redirecting the voice call to the FL 800a).

Further, in response to the query, the S-GW or P-GW 400c obtains (804) a query response (QUERY_RSP) (which provides the subscription information of the UE 100) from the PCRF 400d.

After obtaining the subscription information of the UE 100 from the PCRF 400d, the S-GW or P-GW 400c redirects (805) the call request (CALL_REDIRECT_REQ) of the UE 100 (voice call redirection) to the PSTN 800.

The PSTN 800, upon receiving the call redirect request, sends (806) a call establishment indication to the FL 800a.

In an embodiment, the ongoing voice call is directed to FL 800a and UE 100 simultaneously. The user has an option to either continue call in both the terminals or drop the call at the UE 100.

Once the voice call is redirected to FL 800a from the UE 100, the PSTN 800 indicates (807) the call redirect confirmation (CALL_REDIRECT_CNF) to the S-GW or P-GW 400c. Further, the MME 400b obtains (808) a service confirmation (SERVICE_CNF) indication from the S-GW or P-GW 400c.

Further, the MME 400b sends a service confirmation (SERVICE_CNF) indication (for redirecting the voice call to FL 800a) to the UE 100. Now, the user may release the call at the UE 100 by known release procedures.

Once the voice call is released, the UE 100 indicates the call redirection indication to the eNB 400 for obtaining DRX optimization settings.

The eNB provides the UE 100 with possible DRX optimization settings, once the redirection is completed from the UE 100 to FL 800a.

In an embodiment, the UE 100 may obtain longer DRX cycles or measurement cycles from the eNB 400 for conserving the battery power, once the voice call is redirected to FL 800a.

Further, the same method as described above is applicable in the backward direction, when the UE 100 is moving out of Femtocell and the ongoing voice call is redirected from the FL 800a to the UE 100.

FIG. 9 illustrates the sequence diagram in which a data transfer session is redirected to IPTV for obtaining DRX optimization settings, according to the embodiments as disclosed herein. As depicted in the sequence diagram, when the data transfer is ongoing and the handover from Macro to Femtocell is triggered, the UE 100 transfers the session (data transfer session) to the IPTV 201. Even though in this embodiment, the IPTV 201 is used as an example, the device can be any device which is selected based on the settings provided to the UE 100 (as described in FIG. 7).

Typically, the handover takes place, when UE 100 detects a Femtocell within a given area. Once the UE 100 detects the Femtocell, the UE 100 indicates the eNB 400 about the Femtocell in the given area and releases the connection with the eNB 400 for accessing the converged services of the Femtocell.

The method of redirecting the session transfer (data transfer session) is redirected to IPTV 201 is as described herein.

Initially, the UE 100 sends (901) a service request (SERVICE_REQ) to the MME 400b for redirecting the data transfer to IPTV 201 based on the settings provided to the UE 201. The MME 400b, upon receiving the service request from the UE, redirects (902) the service request (SERVICE_REQ) to the S-GW or P-GW 400c.

The S-GW or P-GW 400c of the UE, queries (903) the PCRF 400d, for obtaining the subscription information of the UE 100.

In an embodiment, the S-GW or P-GW 400c identifies whether the UE 100 has subscribed for the service (for redirecting the voice call to the FL 800a).

Further, in response to the query, the S-GW or P-GW 400c obtains (904) the query response (QUERY_RSP) which provides the subscription information of the UE 100 from the PCRF 400d.

Further the S-GW or P-GW 400c sends (905) the service confirmation (SERVICE_CNF) message to the MME 400b and the MME 400b, further sends (906) the service confirmation (SERVICE_CNF) message to the UE 100.

Once the service confirmation message is received by the UE 100, then the data transfer will be continued as per the settings of the UE 100 as described in FIG. 7.

In an embodiment, the data transfer session of the UE 100 is redirected to the IPTV 201 as shown in the sequence diagram.

Once the data transfer session is transferred to the IPTV 201, then the UE 100 indicates session transfer to the eNB 400 for obtaining the DRX optimization settings.

In an embodiment, the UE 100 may obtain longer DRX cycles or measurement cycles from the eNB 400 for conserving the battery power, once the data transfer session of the UE 100 is redirected to the IPTV 201.

Further, the same method as described above is applicable in the backward direction, when the UE 100 is moving out of Femtocell and the data transfer session is redirected from the IPTV 201 to the UE 100.

In an embodiment, when the UE 100 moves from Femtocell to Macro cell, the data transfer session at the IPTV 201 within the Femtocell is continued.

In an embodiment, for better management of DRX cycles, optimization of $N_{cell}$ or $S_{cell}$ measurement and subsequent trigger of various measurement events, the UE will not measure the Macro cell, as long as it is camped on Femtocell and the measurement report is above the pre-defined threshold.

FIG. 10 illustrates the flow diagram explain the process of adjusting the DRX settings of the user equipment based on the measurement reports, according to the embodiments disclosed herein. The DRX cycles can be adjusted based on the measurements reports sent by the UE 100 to the network. The method of adjusting the DRX settings of the UE 100 based on the measurement reports is as described herein. As depicted in the flow diagram 1000, initially the UE 100 measures (1001) the Reference Signal Received Power (RSRP) and CV_RSRP.

In an embodiment, the UE 100 performs one or more measurements on the serving cell (which is the cell currently being accessed by the user equipment) and any neighboring cells. The measurement values may include, for example, signal levels or signal quality values.

Moreover, the UE 100 may use the reporting thresholds to determine the values to report when the reporting message lacks the capacity (for example, positions) to report measurement values for all the inter-RAT cells.

The UE 100 may report measurements only for cells whose measured values are above the reporting threshold.

In an embodiment, if the UE 100 determines (1002) whether the number measurements considered as per configurations. If the number of measurements is not considered as per configurations, then UE 100 loop backs to the step 1001. If the UE 100 determines that the number of measurements is considered as per configurations, then the UE 100 compares (1003) the measurements with RSRP and CV_RSRP with the $RSRP_{i th}$, $RSRP_{i+1 th}$, $CV\_RSRP_{th}$. If there is any change as a result of comparison, then the network changes (1004) the DRX of the UE 100. If there is no change, then loop backs to step 1001. The various actions in flow diagram 1000 may be performed in the order presented, in a different order or simultaneously. Further, in some embodiments, some actions listed in FIG. 10 may be omitted.

---

If $CV\_RSRP >= CV\_RSRP_{max}$
Change to DRX $Cycle_1$
Else if $CV\_RSRP > CV\_RSRP_{min}$
{
If $RSRP >= RSRP_{i,th}$
DRX $Cycle_i$ -> DRX $Cycle_{i+1}$
Else If $RSRP <= RSRP_{i-1,th}$
DRX $Cycle_i$ -> DRX $Cycle_{i-1}$
Else
No change
}
else
{
If $RSRP > RSRP_{N,th}$
DRX $Cycle_i$ -> DRX $Cycle_N$
Else If $RSRP > RSRP_{N-1,th}$
DRX $Cycle_i$ -> DRX $Cycle_{N-1}$
Else If $RSRP > RSRP_{1,th}$
DRX $Cycle_i$ -> DRX $Cycle_1$
Else
No change
}
Following is the condition for switching to the normal measurements.
$RSRP < RSRPth,normal\_meas$
{
Change to DRX_Cycle1
Trigger normal measurements
}

---

FIG. 11 illustrates a computing environment implementing the method and system for dynamically adjusting the DRX settings of the user equipment based on the parameters, according to the embodiments as disclosed herein. As depicted the computing environment 1101 comprises at least one processing unit 1104 that is equipped with a control unit 1102 and an Arithmetic Logic Unit (ALU) 1103, a memory 1105, a storage unit 1106, plurality of networking devices 1108 and a plurality Input output (I/O) devices 1107. The processing unit 1104 is responsible for processing the instructions of the algorithm. The processing unit 1104 receives commands from the control unit in order to perform its processing. Further, any logical and arithmetic operations involved in the execution of the instructions are computed with the help of the ALU 1103.

The overall computing environment 1101 can be composed of multiple homogeneous and/or heterogeneous cores, multiple CPUs of different kinds, special media and other accelerators. The processing unit 1104 is responsible for processing the instructions of the algorithm. Further, the plurality of processing units 1104 may be located on a single chip or over multiple chips.

The algorithm comprising of instructions and codes required for the implementation are stored in either the memory unit 1105 or the storage 1106 or both. At the time of execution, the instructions may be fetched from the corresponding memory 1105 and/or storage 1106, and executed by the processing unit 1104.

In case of any hardware implementations various networking devices 1108 or external I/O devices 1107 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 11 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for dynamically adjusting discontinuous reception (DRX) settings of a user equipment (UE) connected to a wireless network, the method comprising:
    transmitting, to a base station, an indication for adjusting the DRX settings, when the UE is in a zone for providing a service subscribed by the UE; and
    receiving, from the base station, information including one or more of the DRX settings adjusted based on a location of the UE and the indication,
    wherein the one or more of the DRX settings include an extended DRX cycle, and
    wherein the indication comprises a session transfer indication which indicates the UE transfers a media session to at least one other UE.

2. The method of claim 1, wherein the wireless network comprises at least one of: a core network (CN) and a radio access network (RAN), and wherein the base station is included in the RAN.

3. The method of claim 1, the method further comprising selecting one DRX setting from the one or more DRX settings and indicating the selected DRX setting to the base station.

4. The method of claim 1, the method further comprising receiving information for indicating to change the DRX settings according to an event that triggers the UE to send out one of a measurement report, a measured link quality, a measurement result, or a service type of an ongoing service.

5. The method of claim 1, wherein receiving the information including one or more of the DRX settings comprises receiving one or more DRX optimization setting upon receiving the indication from the UE.

6. The method of claim 1, wherein information related to the service subscribed by the UE is provided to the base station using at least one of: a radio resource control (RRC) connection release message, a non-access stratum (NAS) message and a new RRC message by the UE.

7. The method of claim 1, wherein the UE initiates the transfer of the media session to the at least one other UE using internet protocol (IP) multimedia subsystem (IMS), and wherein the UE indicates a time duration for the transfer of the media session to obtain at least one DRX optimization setting from the base station.

8. The method of claim 1, wherein receiving the information including one or more of the DRX settings comprises receiving measurements from the base station when the UE is in the zone for providing the service subscribed by the UE, wherein the measurements comprise long measurement cycles.

9. The method of claim 1, wherein the indication for adjusting the DRX settings is provided to the base station to obtain at least one DRX optimization setting by the UE, when the UE is utilizing the service subscribed by the UE, the service subscribed by the UE comprising one or more converged services supported by the wireless network.

10. An apparatus for adjusting discontinuous reception (DRX) settings of a user equipment (UE) comprising:
    a transceiver configured to or receive data; and
    a controller configured to control:
        to transmit, to a base station, an indication for adjusting the DRX setting, when the UE is in a zone for providing a service subscribed by the UE, and
        to receive, from the base station, information including one or more of the DRX setting adjusted based on a location of the UE and the indication,
    wherein the one or more of the DRX settings include an extended DRX cycle, and
    wherein the indication comprises a session transfer indication which indicates the UE transfers a media session to at least one other UE.

11. The apparatus of claim 10, wherein a wireless network comprises at least one of: a core network (CN) and a radio access network (RAN), and wherein the base station is included in the RAN.

12. The apparatus of claim 10, wherein the controller is configured to select one DRX setting from the one or more of DRX settings and indicate the selected DRX setting to the base station.

13. The apparatus of claim 10, wherein the controller is configured to receive information for indicating to change the DRX settings according to an event that triggers the UE to send out one of a measurement report, a measured link quality, a measurement result, or a service type of an ongoing service.

14. The apparatus of claim 10, wherein the controller is configured to receive the information including one or more of the DRX settings comprises receiving one or more DRX optimization settings upon receiving the indication from the UE.

15. The apparatus of claim 10, wherein information related to the service subscribed by the UE is provided to the base station using at least one of: a radio resource control (RRC) connection release message, a non-access stratum (NAS) message and a new RRC message by the UE.

16. The apparatus of claim 10, wherein the UE initiates the transfer of the media session to the at least one other UE using internet protocol multimedia subsystem (IMS), and wherein the UE indicates a time duration for the transfer of the media session to obtain at least one DRX optimization setting from the base station.

17. The apparatus of claim 10, wherein the controller is configured to receive relaxed measurements from the base station when the UE is in a femto zone for providing the service subscribed by the UE, wherein the relaxed measurements comprise long measurement cycles.

18. The apparatus of claim 10, wherein the indication for adjusting the DRX settings is provided to the base station to obtain at least one DRX optimization setting by the UE, when the UE is utilizing the service subscribed by the UE, the service subscribed by the UE comprising one or more converged services supported by a wireless network.

19. An apparatus for adjusting discontinuous reception (DRX) setting of a user equipment (UE) connected to a wireless network, comprising:
    a transceiver configured to transmit or receive data; and
    a controller configured to control:
        to receive, from the UE, an indication for adjusting the DRX setting when the UE is in a zone for providing a service subscribed by the UE; and
        to transmit, to the UE, information including one or more of DRX settings adjusted based on a location of the UE and the indication,
    wherein the one or more of the DRX settings include an extended DRX cycle, and
    wherein the indication comprises a session transfer indication which indicates the UE transfers a media session to at least one other UE.

20. The apparatus of claim 19, wherein the wireless network comprises at least one of a core network (CN) and a radio access network (RAN), and wherein a base station is included in the RAN.

21. The apparatus of claim 19, wherein the controller is configured to indicate the UE to change the DRX settings according to an event that triggers the UE to send out one of a measurement report, a measured link quality, a measurement result, or a service type of an ongoing service.

22. The apparatus of claim 19, wherein the controller is configured to receive the information including one or more of the DRX settings comprises transmitting one or more DRX optimization settings upon receiving the indication.

23. The apparatus of claim 19, wherein information related to the service subscribed by the UE is provided to a base station using at least one of: a radio resource control (RRC) connection release message, a non-access stratum (NAS) message and a new RRC message by the UE.

24. The apparatus of claim 19, wherein the UE initiates the transfer of the media session to the at least one other UE using internet protocol multimedia subsystem (IMS), and wherein the UE indicates a time duration for the transfer of the media session to obtain at least one DRX optimization setting from a base station.

25. The apparatus of claim 19, wherein the controller is configured to transmit relaxed measurements when the UE is in the zone for providing the service subscribed by the UE, wherein the relaxed measurements comprise long measurement cycles.

26. The apparatus of claim 19, wherein the indication for adjusting the DRX settings is provided to a base station to obtain at least one DRX optimization setting by the UE, when the UE is utilizing the service subscribed by the UE, the service subscribed by the UE comprising one or more converged services supported by the wireless network, and wherein the controller is configured to transmit one or more DRX settings in response to the indication.

27. A user equipment (UE) for dynamically adjusting discontinuous reception (DRX) settings, connected to a wireless network, wherein the UE comprises:
at least one memory storing a computer program code;
at least one processor configured to execute the computer program code to cause the UE to:
transmit, to a base station, an indication for adjusting the DRX setting, when the UE is in a zone for providing a service subscribed by the UE; and
receive, from the base station, information including one or more of the DRX settings adjusted based on a location of the UE and the indication,
wherein the one or more of the DRX settings include an extended DRX cycle, and
wherein the indication comprises transmitting a session transfer indication which indicates the UE transfers a media session to at least one other UE.

28. The UE of claim 27, wherein the UE is configured to select one DRX setting from the one or more of DRX settings and the UE is further configured to indicate the selected DRX setting to the base station.

29. A method for adjusting discontinuous reception (DRX) setting of a user equipment (UE), comprising:
receiving, from the UE, an indication for adjusting the DRX setting, when the UE is in a zone for providing a service subscribed by the UE; and
transmitting, to the UE, information including one or more of DRX settings adjusted based on a location of the UE and the indication,
wherein the one or more of the DRX settings include an extended DRX cycle, and
wherein the indication comprises a session transfer indication which indicates the UE transfers a media session to at least one other UE.

30. The method of claim 29, wherein a wireless network comprises at least one of a core network (CN) and a radio access network (RAN), and wherein a base station is included in the RAN.

31. The method of claim 29, the method further comprising receiving a selected DRX setting from the one or more of DRX settings.

32. The method of claim 29, the method further comprising indicating the UE to change the DRX settings according to an event that triggers the UE to send out one of a measurement report, a measured link quality, a measurement result, or a service type of an ongoing service.

33. The method of claim 29, wherein the transmitting the information including one or more of the DRX settings comprises transmitting one or more DRX optimization settings upon receiving the indication.

34. The method of claim 29, wherein information related to the service subscribed by the UE is provided to a base station using at least one of: a radio resource control (RRC) connection release message, a non-access stratum (NAS) message and a new RRC message by the UE.

35. The method of claim 29, wherein the UE initiates the transfer of the media session to the at least one other UE using internet protocol (IP) multimedia subsystem (IMS), and wherein the UE indicates a time duration for the transfer of the media session to obtain at least one DRX optimization setting from a base station.

36. The method of claim 29, wherein the transmitting the information including one or more of the DRX settings comprises transmitting relaxed measurements when the UE is in the zone for providing the service subscribed by the UE, wherein the relaxed measurements comprise long measurement cycles.

37. The method of claim 29, wherein the indication for adjusting the DRX settings is provided to a base station to obtain at least one DRX optimization setting by the UE, when the UE is utilizing the service subscribed by the UE, the service subscribed by the UE comprising one or more converged services supported by a wireless network.

* * * * *